(12) United States Patent
O'byrne (10) Patent No.: US 8,788,956 B2
(45) Date of Patent: Jul. 22, 2014

(54) SYMBOLIC TREE NODE SELECTOR

(75) Inventor: John O'byrne, Sunnyvale, CA (US)

(73) Assignee: Business Objects Software Ltd., Dublin (IE)

( * ) Notice: Subject to any disclaimer, the term of this patent is extended or adjusted under 35 U.S.C. 154(b) by 459 days.

(21) Appl. No.: 12/962,104

(22) Filed: Dec. 7, 2010

(65) Prior Publication Data

US 2012/0144328 A1  Jun. 7, 2012

(51) Int. Cl.
| G06F 3/0481 | (2013.01) |
| G06F 3/0482 | (2013.01) |
| G06F 3/048 | (2013.01) |
| G09F 9/40 | (2006.01) |

(52) U.S. Cl.
CPC .................. *G06F 3/0482* (2013.01)
USPC ............ 715/764; 715/810; 715/853; 715/821

(58) Field of Classification Search
None
See application file for complete search history.

(56) References Cited

U.S. PATENT DOCUMENTS

| 4,730,252 | A | * | 3/1988 | Bradshaw | ............................. 1/1 |
| 7,793,230 | B2 | * | 9/2010 | Burns et al. | .................. 715/787 |
| 8,095,499 | B2 | * | 1/2012 | Thanu | ........................... 707/607 |
| 2004/0168119 | A1 | * | 8/2004 | Liu et al. | .................... 715/501.1 |
| 2006/0235817 | A1 | * | 10/2006 | Wong et al. | ....................... 707/1 |

* cited by examiner

*Primary Examiner* — Weilun Lo
*Assistant Examiner* — Stella Eun
(74) *Attorney, Agent, or Firm* — Schwegman, Lundberg & Woessner, P.A.

(57) ABSTRACT

A computer-implemented system member selector module is described. The member selector module comprises presentation module, a request detector, and a tree view updater. The presentation module presents a tree view representing hierarchically organized data comprising a plurality of member nodes. The request detector detects a request to apply a selection function to one or more member nodes. The tree view updater updates the tree view in response to the request and produces an updated tree view that identifies the one or more member nodes as parameters of the selection function.

18 Claims, 7 Drawing Sheets

SYMBOLIC TREE NODE SELECTOR

FIELD

This disclosure relates to symbolic selection of nodes in a hierarchical tree presented within a graphical user interface in a computer system.

BACKGROUND

In hierarchical databases, dimensions often have a hierarchical structure. For example, a dimension "products" in an OLAP (On-Line Analytical Processing) cube may itself have several members such as "accessories," "bikes," "clothing," etc. Each of those lower-level dimensions may in turn have members. The hierarchical structure may be visualized as a tree having multiple levels that forms a set of parent-child relationships between the nodes of the tree. These relationships are the basis for aggregation, as well as expand and collapse operations within the dimension hierarchy. The highest level of the hierarchy is the most aggregated and the lowest level is the least aggregated. Each level corresponds to a different semantic level of detail for that dimension.

On-Line Analytical Processing (OLAP) is an approach that allows decision-makers to quickly and interactively analyze multi-dimensionally modeled data appropriate to various contexts. Example applications of OLAP include business reporting for sales, marketing, management reporting, business process management, budget forecasting, financial reporting, and similar areas.

BRIEF DESCRIPTION OF DRAWINGS

Embodiments are illustrated by way of example and not limitation in the figures of the accompanying drawings, in which like references indicate similar elements and in which.

DETAILED DESCRIPTION

Data stored in a computer system may be organized in a hierarchical manner, e.g., as a tree, in a way that permits users to access values associated with the nodes of the tree. The nodes of a tree representing a hierarchical data structure may be referred to as members or member nodes. A computer-implemented user interface (UI) may be provided to present the stored data on a display device, as well as to permit a user to interact with the stored data, e.g., by activating one or more visual controls presented on the display device as part of the UI. A user may be permitted to select member nodes and request generation of a report that includes data associated with the selected member nodes. In one embodiment, the process of selecting member nodes using a selection function is a dynamic process, where applying a function to a member node causes the displaying of resulting selected nodes within the associated tree view area.

For example, a tree structure may contain member nodes representing employee names grouped in a hierarchical manner by their association with a supervising vice president, as shown below in Table 1.

---
+President
    +VicePresident1
        -Employee1
        -Employee2
        -Employee3
    +VicePresident2
        -Employee4
        -Employee5
        -Employee6

---

A user may wish to request an electronic report listing the names of those employees that are supervised by a particular vice president, e.g., "VicePresident1." In order to indicate those members that are of interest, a user may explicitly select member nodes from the tree. For example, a user may select "Employee1," "Employee2," and "Employee 3" members, e.g., using expression (1) shown below.

$$\{Employee1, Employee2, Employee3\} \qquad (1)$$

A request associated with "Employee1," "Employee2," and "Employee 3" may result in presenting Employee member records as shown below in Table 2.

TABLE 2

| |
|---|
| Mrs. Smith (VP) |
| Potter, Harry |
| Wiggin, Andrew |
| Sachar, Lewis |

Another way to select members representing employees that report to "VicePresident1" is to use symbolic expression (2) shown below.

$$VicePresident1.Children. \qquad (2)$$

While the first expression returns the three specific Employee member records, the second expression returns all hierarchical children of the member "VicePresident1." The result of the second expression changes as the number and/or identity of the hierarchical children of the member "VicePresident1" change. The complexity of combining, in a single UI, explicit node selection and selection of nodes using a selection function is addressed, in one example embodiment, by providing a computer-implemented module termed "member selector" in the context of a business application. A member selector module may be provided as part of an OLAP client application. In some embodiments, a member selector module may be provides by a business application running on a server computer system to a browser application running on a client computer system.

An example member selector module (that may also be referred to as a symbolic tree node selector) may be in the form of an enhanced tree widget that presents a hierarchical tree structure having nodes (or members) and allows selection of individual nodes, and also allows applying selection functions to nodes. The UI provided by an example member selector module may be configured to display, in a first display area (a tree view pane), visual feedback that shows which member nodes or groups of member nodes are being currently selected for inclusion or exclusion. The tree structure displayed in the tree view pane may have a great number of nodes that may be expanded or collapsed to respectively display or hide their respective children and descendants. A user may be able to expand a tree node by, e.g., double-clicking on a symbolic expression associated with that node displayed in the second display area.

The UI provided by an example member selector module may also include a second display area, a summary pane presented in addition to the first display area where the tree view is presented, that displays a flat table listing symbolic expressions corresponding to the member nodes that have been selected by a user for inclusion or exclusion from an electronic report. The symbolic expressions in the summary pane may be, e.g., statements using MultiDimensional eXpressions (MDX) language. The first and the second display areas may be presented on a display device in the same view, such that both display areas are simultaneously visible to a user. In one embodiment, user interaction directed to tree view pane causes changes in the summary pane and vice versa.

The example member selector module may be configured to permit users to include a member node or a group of member nodes into a requested electronic report, as well as exclude a member or a group of members from the requested electronic report. In one embodiment, the UI provided by an example member selector module may present tree-node decorations to indicate that one or more functions are being applied to the node. For example, member nodes selected for inclusion into an electronic report may be presented using visual highlighting (e.g., a bold font); member nodes selected for exclusion from an electronic report may be presented using different visual highlighting (e.g., grayed out, stricken-out, dimmed, etc.) Additionally, the UI provided by an example member selector module may present may present visual indications, e.g., symbols, corresponding to respective selection functions. For example, a down arrow presented next to a member node may be indicative of a selection function to be applied to the children of the member node; two down arrows presented next to a member node may be indicative of a selection function to be applied to the ancestors of the member node. Various symbols corresponding to respective selection functions are described further below with reference to FIG. 3. A diagrammatic representation of an example UI 100 provided by a member selector module is shown in FIG. 1.

Figure 1:
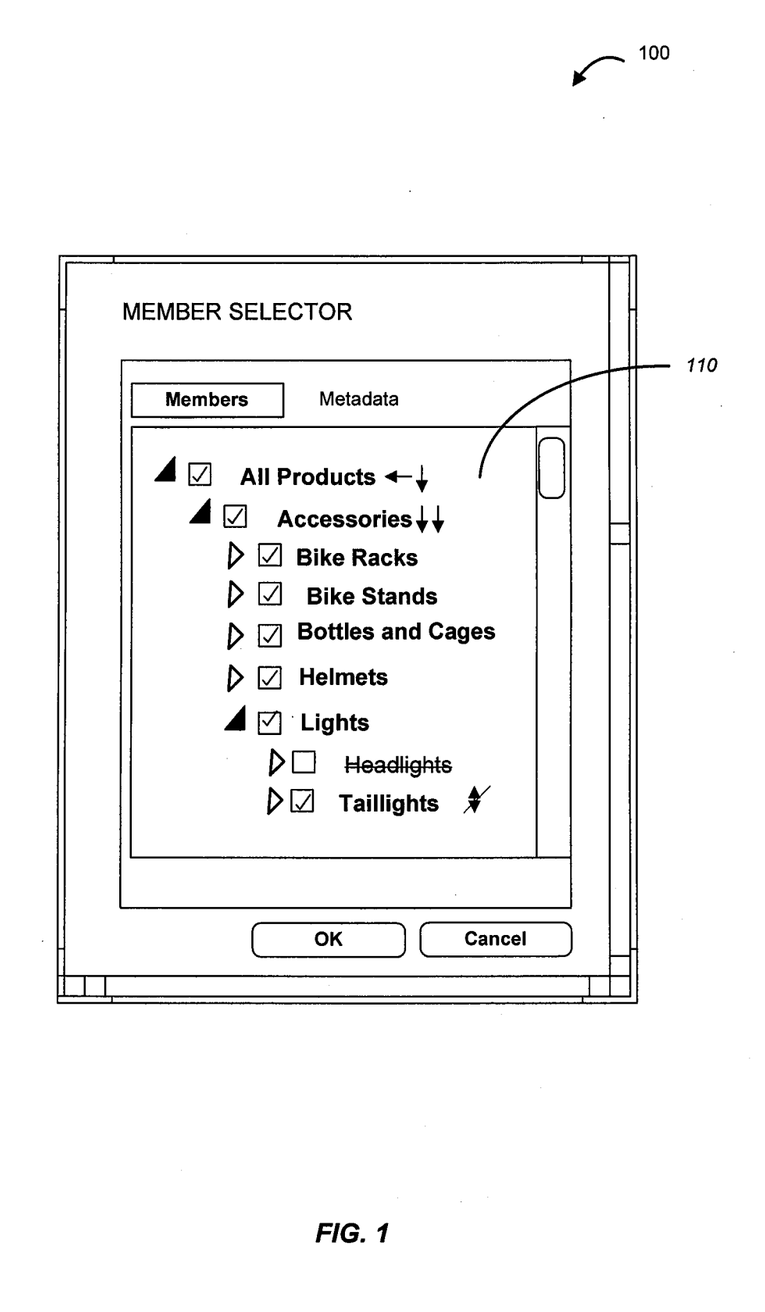
FIG. 1 is a diagrammatic representation of an example tree view provided by a member selector module, in accordance with an example embodiment.

As shown in FIG. 1, the UI 100 includes a display area 110 (a tree view) displaying a tree structure having "All Products" level that includes "Accessories" level. The "Accessories" level is considered to be a child node of "All Products" and, in turn, has children nodes ("Bike Racks," "Bike Stands," "Lights," etc.) and descendents ("Headlights" and "Taillights"). The highlighting and visual decorations that can be seen in the display area 110 indicate that "All Products" category and children nodes of the "All Products" category and descendent nodes of the "Accessories" category have been selected to be included in an electronic report to be generated by a selection function, while the siblings of the "Taillights" member node have been excluded from the electronic report to be generated by the selection function. In the example shown in FIG. 1, those member nodes that are to be included in the electronic report to be generated by the selection function are highlighted by presenting the labels of those member nodes in a bold font. Those member nodes that are to be excluded from an electronic report to be generated by the selection function are highlighted by presenting the labels of those member nodes in a strike-through font.

Figure 2:
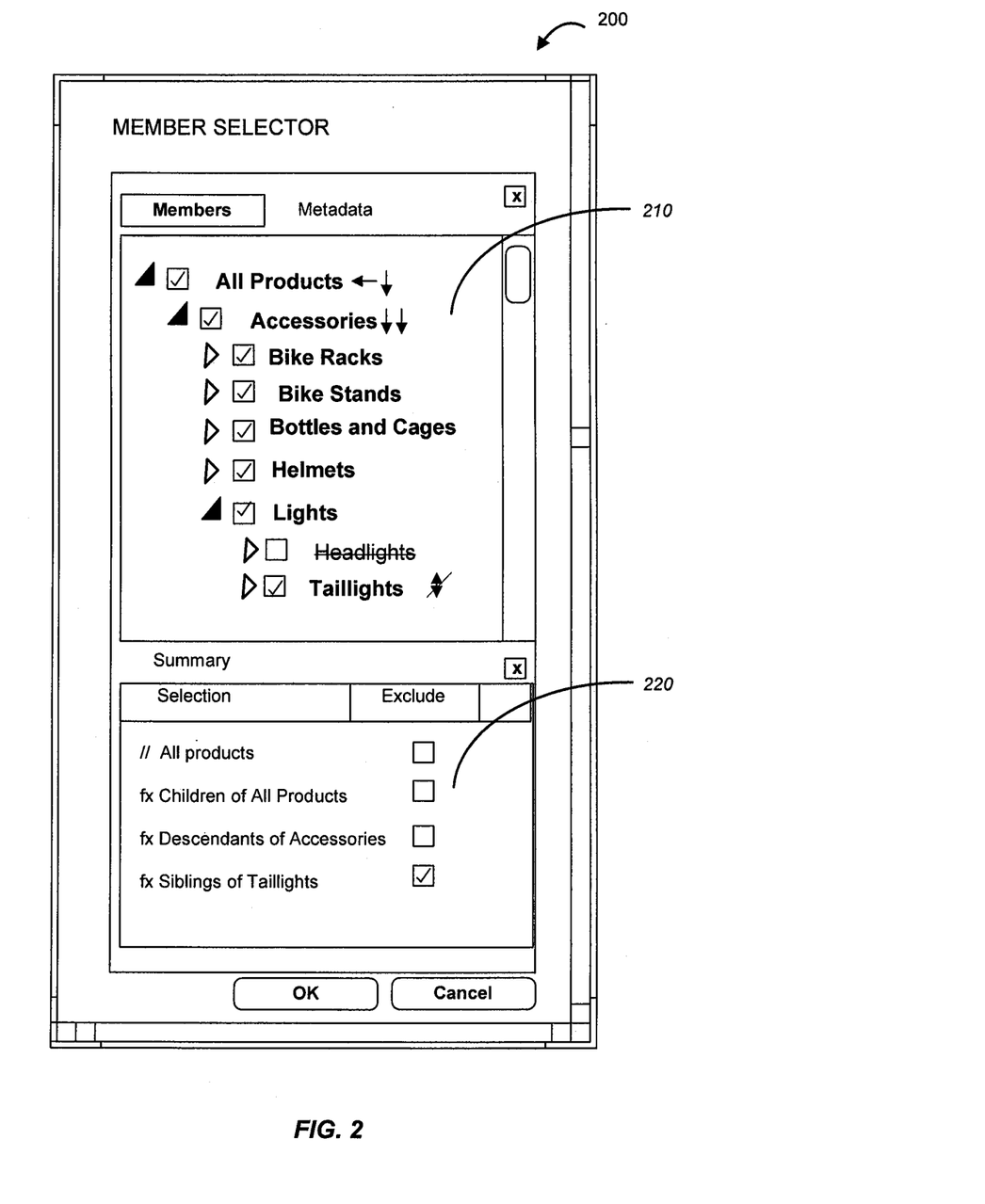
FIG. 2 is a diagrammatic representation of an example combined tree view and summary view provided by a member selector module, in accordance with an example embodiment.

As mentioned above, a tree view may be presented together with a summary pane that presents a tabular summary of symbolic language statements for member selections. FIG. 2 is a diagrammatic representation of an example UI 200 presenting combined tree view and summary view provided by a member selector module, in accordance with an example embodiment. A display area 210 shown in FIG. 2 corresponds to the display area 110 of FIG. 1. A display area 220 is a summary pane presenting tabular summary of symbolic language statements for member selection. As can be seen in the display area 220, the presence of a symbolic language statement indicates that the associated member nodes are to be included in the report generated by the selection function or explicitly excluded from such report. The checkboxes associated with respective symbolic language statements indicate which of the member nodes are to be excluded from a report generated by the selection function.

As shown in the display area 220, the selected member nodes include the "All Products" member node, its children, and the descendents of the "Accessories" member node have been selected to be included in the report generated by a selection function, while the siblings of the "Taillights" member node have been excluded from the electronic report to be generated by the selection function.

Figure 3:
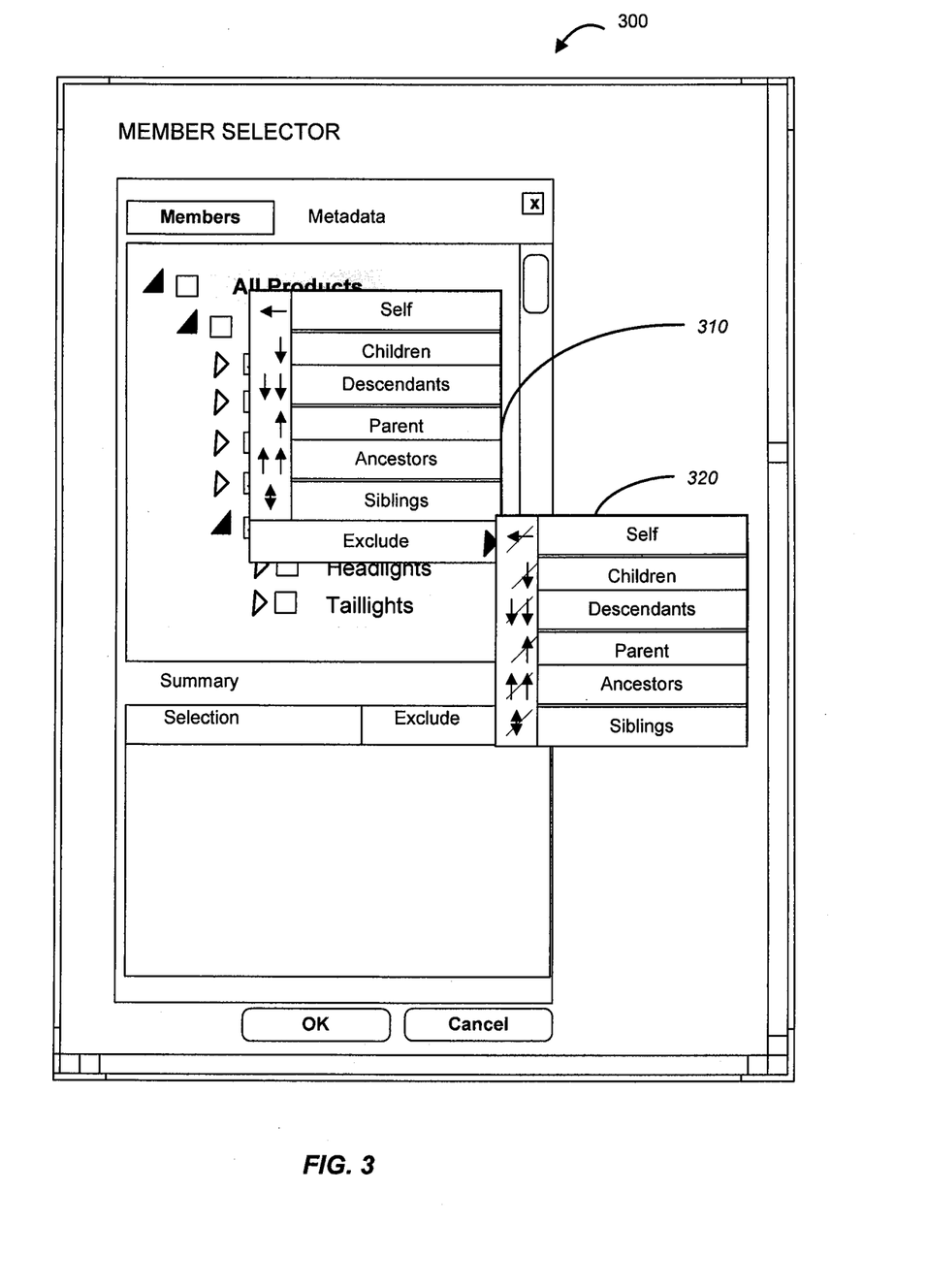
FIG. 3 is a diagrammatic representation of an example user interface (UI) provided by a member selector module for requesting to invoke a selection function, in accordance with an example embodiment.

In one embodiment, a user may be permitted to request that a selection function is invoked with respect to certain member nodes by means of drop-down menus that allow a user to specify which members of the associated tree structure are to be included in or excluded from an electronic report. FIG. 3 is a diagrammatic representation of an example UI 300 provided by a member selector module for requesting to invoke a selection function with respect to certain member nodes, in accordance with an example embodiment. Shown in FIG. 3, a drop-down menu 310 is activated with respect to the "All Products" member node. The drop-down menu 310 allows a user to include or exclude member nodes. A selection function indicating inclusion or exclusion of a member node from an electronic report may be applied to self (to the member node with respect to which the drop-down menu was activated), to its children, descendents, parent, ancestors, or siblings. Each of the choices in the drop-down menu 310 may be associated with a symbol. For example, the "self" choice is associated with a left-pointing arrow; the "children" choice is associated with a down arrow, etc. The drop-down menu 310, in one embodiment, may be expanded so that a drop-down menu 320 is presented. The drop-down menu 320 allows a user to apply the selection function to exclude certain member nodes. Some components of an example member selector module can be described with reference to FIG. 4.

Figure 4:
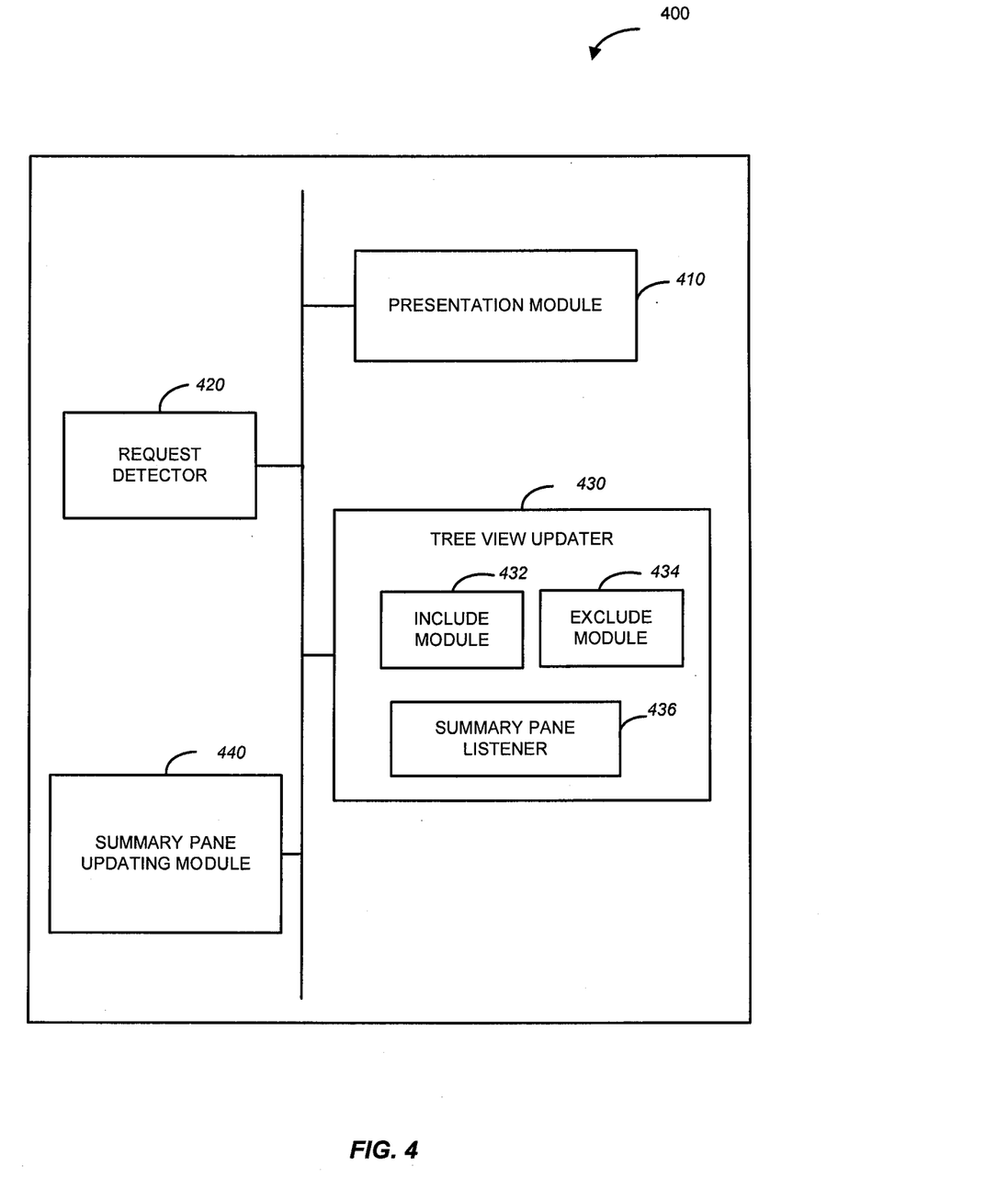
FIG. 4 is a diagrammatic representation of a member selector module, in accordance with an example embodiment.

FIG. 4 is a diagrammatic representation of a member selector module 400, in accordance with an example embodiment. The member selector module, as shown in FIG. 4, comprises a presentation module 410, a request detector 420, and a tree view updater 430. The presentation module 410 may be configured to present, on a display device, a tree view that comprises a tree structure representing hierarchically organized data. The tree structure may comprise a plurality of member nodes that may be expanded or collapsed. In one embodiment, the hierarchically organized data represented by the tree structure is in the form of an OLAP cube. The request detector 420 may be configured to detect a request to apply a selection function to one or more member nodes from the plurality of member nodes. As explained above, a user may be permitted to specify which member nodes are to be included into or excluded from the selection by means of one or more drop-down menus. The tree view updater 430 may be configured to update the tree view in response to the request to apply a selection function to one or more member nodes. The tree view updater 430 produces an updated (or a preview) tree view that identifies, visually, the one or more member nodes as parameters of the selection function.

The tree view updater 430, in one embodiment, comprises an include module 432 and an exclude module 434. The include module 432 may be configured to present the one or more member nodes in a highlighted manner to indicate that the selection function is to include data corresponding to the one or more member nodes into an electronic report, e.g., by presenting those member nodes in a bold font or by otherwise highlighting those member nodes. The exclude module 434 may be configured to present the one or more member nodes in a manner indicating that the selection function is to exclude data corresponding to the one or more member nodes from an electronic report, e.g., by presenting those member nodes in a strike-through font.

The member selector module 400 may also include a summary pane module 440. The summary pane module 440 may be configured to present a summary view, which may be viewable simultaneously with the tree view. The summary view may present one or more symbolic statements representing one or more respective selection functions. An example summary view was discussed above with reference to FIG. 2. As shown in FIG. 4, the tree view updater may include a summary pane listener 436, which may be configured to detect that a user made a change in the summary pane and, in response, update the tree view to reflect that change. For example, a user may be permitted to cancel one of previously chosen selection functions by deleting an associated symbolic statement from the summary pane. The summary pane listener 436 detects this change and, in response, causes the tree view updater 430 to update the tree view to no longer highlight the member nodes associated with the cancelled statement. Example operations performed by the member selector module may be discussed with reference to FIG. 5.

Figure 5:
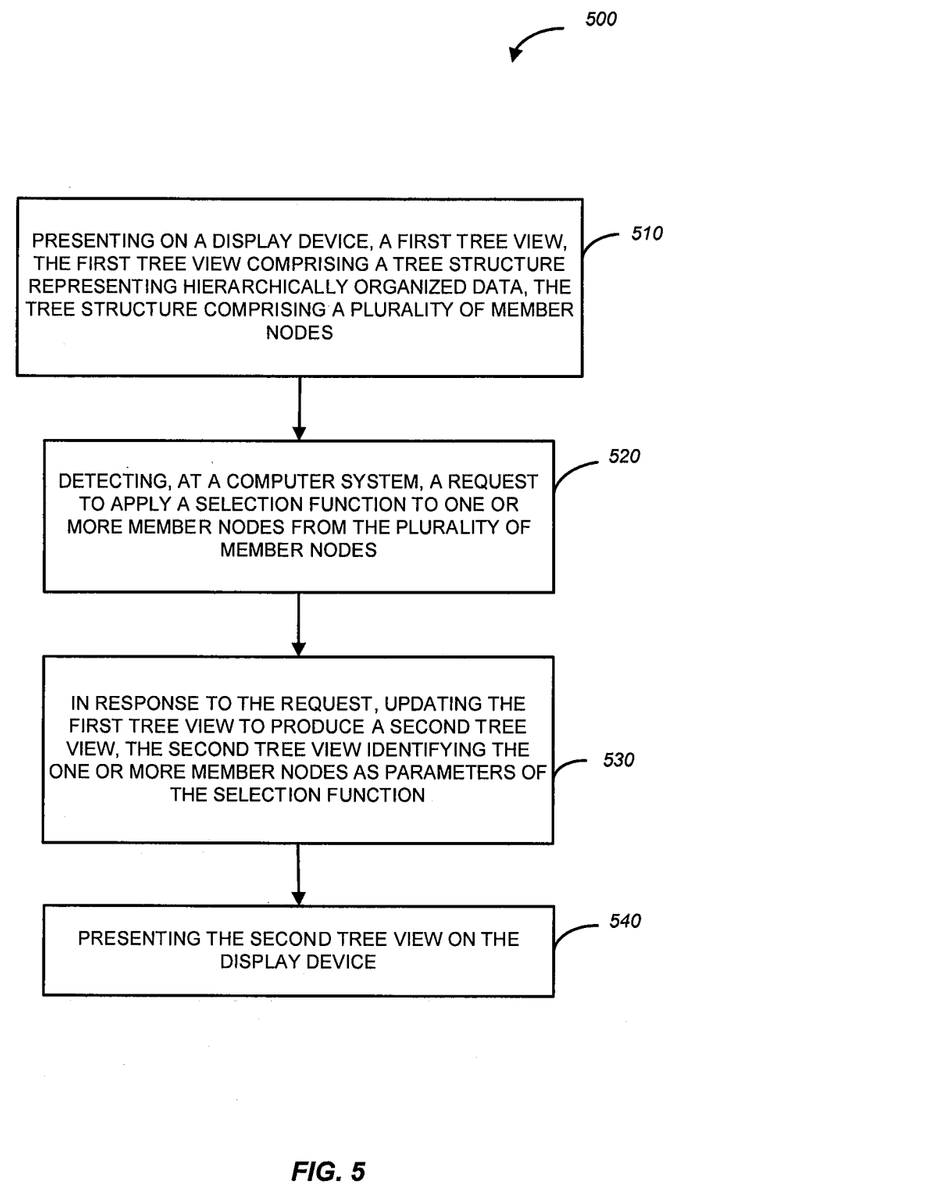
FIG. 5 is a is a flow chart illustrating a method for applying selection functions to one or more member nodes, in accordance with an example embodiment.

FIG. 5 is a is a flow chart illustrating a method for applying selection functions to one or more member nodes, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 4.

As shown in FIG. 5, the method 500 commences at operation 510, where the presentation module 410 of FIG. 4 presents, on a display device, a tree view that comprises a tree structure representing hierarchically organized data. As explained above, the tree structure may comprise a plurality of member nodes, in one embodiment, represent hierarchically organized data that may be in the form of an OLAP cube. At operation 520, the request detector 420 of FIG. 4 detects a request to apply a selection function to one or more member nodes from the tree structure. At operation 530, the tree view updater 430 of FIG. 4 updates the tree view in response to the request to apply a selection function to one or more member nodes in order to produce a second tree view (a preview). The preview identifies the member nodes as parameters of the selection function by highlighting those member nodes. For example, member nodes that are to be included by the selection function may be presented in a bold font and member nodes that are to be explicitly excluded from the application of the selection function may be presented in a strike-through font. The second tree view is presented on the display device at operation 540.

Figure 6:
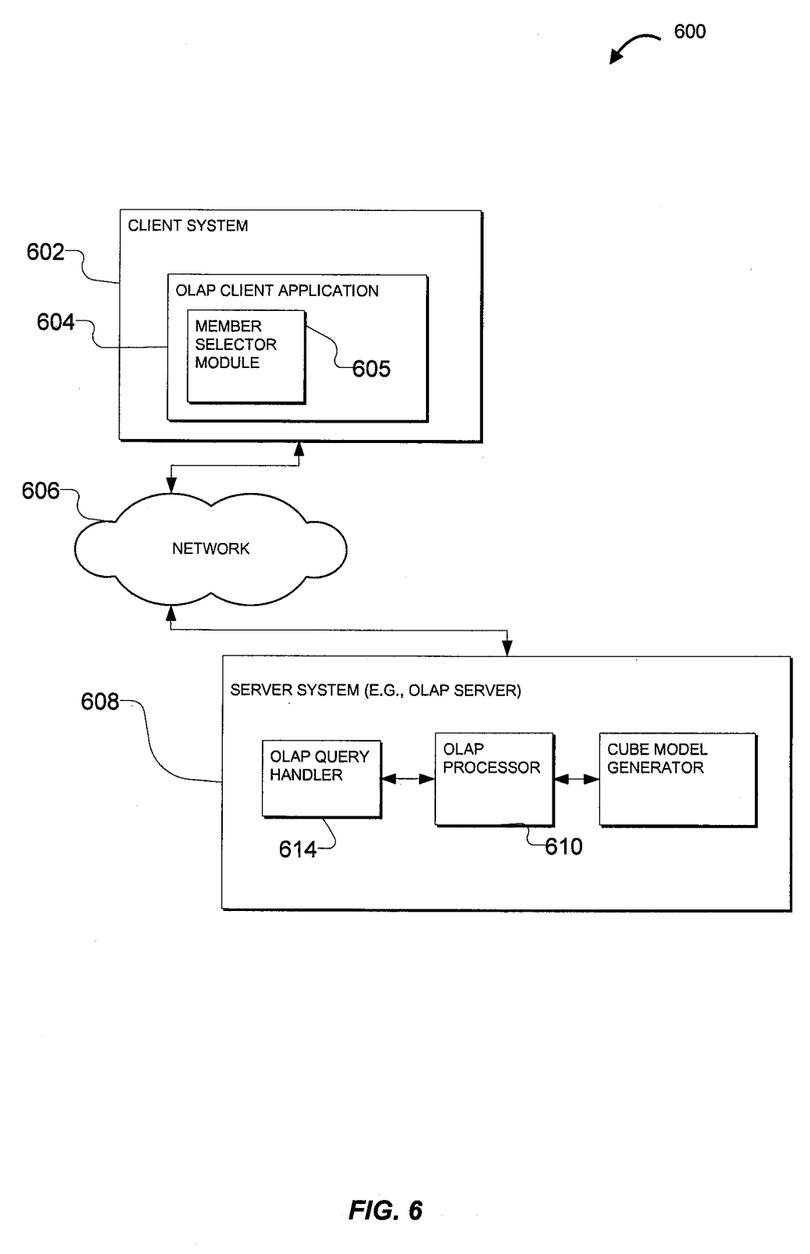
FIG. 6 is a is a diagrammatic representation of a network environment within which method and system for applying selection functions to one or more member nodes may be implemented, in accordance with an example embodiment.

A method and system for applying selection functions to one or more member nodes, utilizing a member selector module, may be implemented, in one example embodiment, in the context of a network environment. An example network environment 600 is illustrated in FIG. 6. As shown in FIG. 6, the network environment 600 may include a client system 602, a server system (here, an OLAP server) 608 and an information resource 616. The client system 602 may run an OLAP client application 604 (or simply an OLAP client) that includes a member selector module 605 and may have access to the OLAP server system 608 via a communications network 606. The communications network 606 may be a public network (e.g., the Internet, a wireless network, etc.) or a private network (e.g., a local area network (LAN), a wide area network (WAN), Intranet, etc.).

The OLAP server 608 includes an OLAP processor 610, a cube model generator 612, and an OLAP query handler 614. The OLAP processor 610 is configured to cooperate with the cube model generator 612 and the OLAP query handler 614. The cube model generator 612 may be configured to generate cube models based on the requirements provided to the OLAP server 608. The OLAP query handler 614 is configured, according to one embodiment, to process queries directed to an OLAP cube.

The OLAP server 608 that hosts the cube model generator 612 and the OLAP query handler 614 may be configured to be in communication with an information resource configured to store data models (e.g., a tree structure), as well as the cube models generated by the cube model generator 612. In one example embodiment, the OLAP client 604 may utilize the member selector module 605 to issue queries to the OLAP query handler 614 of the OLAP server 608, the OLAP query handler 614 being communicatively coupled to an OLAP processor 610. The OLAP processor 610, in turn, makes multi-dimensionally formatted data available to the OLAP client 604, and may be optimized for analysis and reporting on very large data sets.

Figure 7:
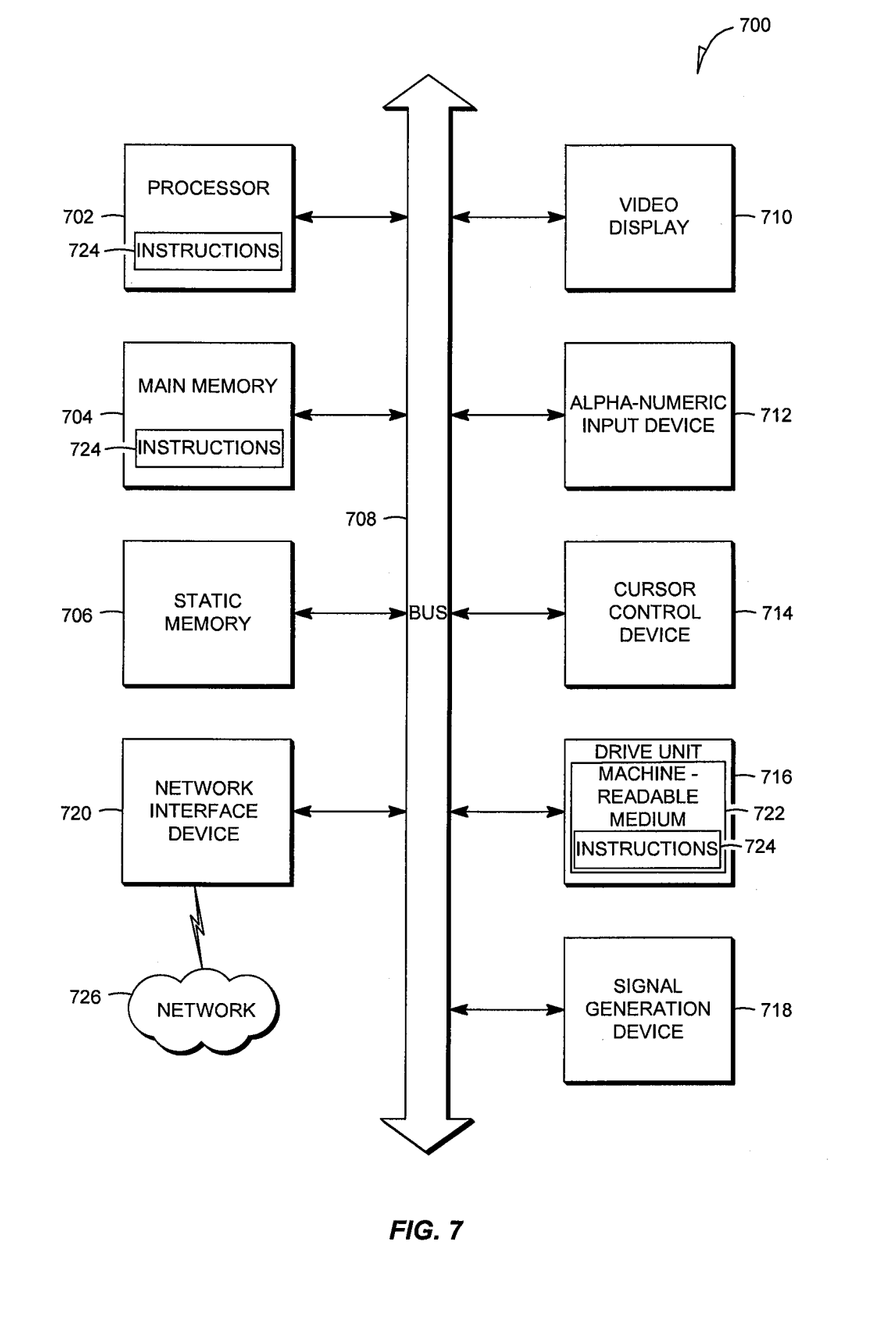
FIG. 7 is a diagrammatic representation of a machine in the example form of a computer system within which a set of instructions, for causing the machine to perform any one or more of the methodologies discussed herein, may be executed.

FIG. 7 is a diagrammatic representation of a machine in the example electronic form of a computer system 700 within which a set of instructions, for causing the machine to perform any one or more of the methodologies discussed herein, may be executed.

In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 707, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., instructions 724) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

The instructions 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like. The term "machine-readable storage medium" shall be taken to exclude data signals he Thembodied in carrier waves.

The embodiments described herein may be implemented in an operating environment comprising software installed on a computer, in hardware, or in a combination of software and hardware.

Thus, an example symbolic tree node selector have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
   presenting on a display device, a first tree view representing hierarchically organized data comprising a plurality of member nodes;
   detecting, at a computer system a request to apply a selection function to one or more member nodes from the plurality of member nodes, the selection function identifying data corresponding to one or more of the plurality of member nodes to be included into or excluded from an electronic report;
   in response to the request, updating the first tree view to produce a second tree view, the second tree view identifying the one or more member nodes as parameters of the selection function and describing each of the one or more member nodes as one or more of a sibling, a child, a descendent, a parent, and an ancestor, the description comprising one or more of a word and a symbol;
      wherein an application of the selection function to a first member node is indicated by a symbol, wherein a first symbol indicates that the selection function is to be applied to all children of the first member node, a second symbol indicates that the selection function is to be applied to all descendants of the first member node, a third symbol indicates that the selection function is to be applied to all parents of the first member node and a fourth symbol indicates that the selection function is to be applied to all ancestors of the first member node; and
   presenting the second tree view on the display device.

2. The method of claim 1, wherein the second tree view presents the one or more member nodes in a first highlighted manner to indicate that the selection function is to include data corresponding to the one or more member nodes into the electronic report.

3. The method of claim 1, wherein the second tree view presents the one or more member nodes in a bold font.

4. The method of claim 1, wherein the second tree view presents the one or more member nodes in a second highlighted manner to indicate that the selection function is to exclude data corresponding to the one or more member nodes from the electronic report.

5. The method of claim 1, wherein the second tree view presents the one or more member nodes in a strike-through font.

6. The method of claim 1 comprising presenting a summary view, the summary view viewable simultaneously with the second tree view, the summary view presenting a listing of symbolic expressions corresponding to the member nodes that are selected for inclusion or exclusion from the electronic report.

7. The method of claim 1 wherein the one or more member nodes are selected by requesting selection using one or more of a child indicator, a descendent indicator, a parent indicator, a sibling indicator, or an ancestor indicator of a first member node from the plurality of member nodes.

8. The method of claim 1, wherein the hierarchically organized data is an On-Line Analytical Processing (OLAP) cube.

9. A computer-implemented system comprising:
   a presentation module to present, on a hardware display device, a first tree view representing hierarchically organized data comprising a plurality of member nodes;
   a request detector to detect, at a hardware computer system, a request to apply a selection function to one or more member nodes from the plurality of member nodes, the selection function identifying data corresponding to one or more of the plurality of member nodes to be included into or excluded from an electronic report;
   a tree view updater to update the first tree view, in response to the request, to produce a second tree view, the second tree view identifying the one or more member nodes as parameters of the selection function and describing each of the one or more member nodes as one or more of a sibling, a child, a descendent, a parent, and an ancestor, the description comprising one or more of a word and a symbol;

wherein an application of the selection function to a first member node is indicated by a symbol, wherein a first symbol indicates that the selection function is to be applied to all children of the first member node, a second symbol indicates that the selection function is to be applied to all descendants of the first member node, a third symbol indicates that the selection function is to be applied to all parents of the first member node and a fourth symbol indicates that the selection function is to be applied to all ancestors of the first member node.

10. The system of claim 9, wherein the request detector is to detect that the selection function is to include data corresponding to the one or more member nodes into an electronic report.

11. The system of claim 9, wherein the request detector is to detect that the selection function is to exclude data corresponding to the one or more member nodes from an electronic report.

12. The system of claim 9, wherein the second tree view presents the one or more member nodes in a first highlighted manner to indicate that the selection function is to include data corresponding to the one or more member nodes into an electronic report.

13. The system of claim 9, wherein the second tree view presents the one or more member nodes in a bold font.

14. The system of claim 9, wherein the second tree view presents the one or more member nodes in a second highlighted manner to indicate that the selection function is to exclude data corresponding to the one or more member nodes from an electronic report.

15. The system of claim 9, wherein the second tree view presents the one or more member nodes in a strike-through font.

16. The system of claim 9, comprising a summary pane module to present a summary view, the summary view viewable simultaneously with the second tree view, the summary view presenting a listing of symbolic expressions corresponding to the member nodes that are selected for inclusion or exclusion from the electronic report.

17. The system of claim 9, wherein the hierarchically organized data is an On-Line Analytical Processing (OLAP) cube.

18. A machine-readable non-transitory medium having instruction data to case a machine to:
present, on a display device, a first tree view representing hierarchically organized data comprising a plurality of member nodes;
detect, at a computer system a request to apply a selection function to one or more member nodes from the plurality of member nodes, the selection function identifying data corresponding to one or more of the plurality of member nodes to be included into or excluded from an electronic report;
update the first tree view, in response to the request, to produce a second tree view, the second tree view identifying the one or more member nodes as parameters of the selection function and describing each of the one or more member nodes as one or more of a sibling, a child, a descendent, a parent, and an ancestor, the description comprising one or more of a word and a symbol;
wherein an application of the selection function to a first member node is indicated by a symbol, wherein a first symbol indicates that the selection function is to be applied to all children of the first member node, a second symbol indicates that the selection function is to be applied to all descendants of the first member node, a third symbol indicates that the selection function is to be applied to all parents of the first member node and a fourth symbol indicates that the selection function is to be applied to all ancestors of the first member node; and
present the second tree view on the display device.

* * * * *